United States Patent

Hutchins

[11] Patent Number: 5,787,845
[45] Date of Patent: Aug. 4, 1998

[54] COMBINED BYPASS AND THERMOSTAT ASSEMBLY

[75] Inventor: William Richard Hutchins, Kenilworth, England

[73] Assignee: Rover Group Limited, Warwick, England

[21] Appl. No.: 897,209

[22] Filed: Feb. 10, 1997

[30] Foreign Application Priority Data

Mar. 6, 1996 [GB] United Kingdom ............... 9604780

[51] Int. Cl.[6] .................................................. F01P 7/14
[52] U.S. Cl. ................................ 123/41.05; 123/41.09
[58] Field of Search ........................... 123/41.05, 41.09, 123/41.08, 41.1

[56] References Cited

U.S. PATENT DOCUMENTS

| | | | |
|---|---|---|---|
| 4,055,298 | 10/1977 | Wilson | 236/34.5 |
| 4,288,031 | 9/1981 | Hass | 123/41.1 |
| 4,425,877 | 1/1984 | Fritzenwenger et al. | 123/41.1 |
| 4,621,594 | 11/1986 | Kubis | 123/41.09 |
| 4,679,530 | 7/1987 | Kuze | 123/41.1 |
| 5,183,012 | 2/1993 | Saur et al. | 123/41.08 |
| 5,642,691 | 7/1997 | Schroeder | 123/41.09 |

FOREIGN PATENT DOCUMENTS 2281613 7/1994 United Kingdom.

*Primary Examiner*—David A. Okonsky
*Attorney, Agent, or Firm*—Davis and Bujold

[57] ABSTRACT

To ensure an adequate supply of hot engine coolant to a heater circuit at low engine speeds, a combined thermostat and bypass valve 10 is arranged to restrict bypass flow by means of a spring-loaded bypass valve 38 operating at a bypass delivery port 16. At low engine speeds the bypass flow pressure is insufficient to lift the bypass valve 38 from its seating and the flow through a heat exchanger "H" in the heater circuit is thereby enhanced.

10 Claims, 2 Drawing Sheets

COMBINED BYPASS AND THERMOSTAT ASSEMBLY

This invention relates to motor vehicles of the kind having an internal combustion engine and in particular to a combined bypass and thermostat assembly for the engine cooling system for the vehicle and a heating system which utilizes heat generated by the engine of the vehicle to provide an energy source for the heater.

BACKGROUND OF THE INVENTION

It is known to provide a heating system for a vehicle in which waste engine heat is used to heat air which is fed into a passenger compartment of the vehicle.

Such a heater system normally takes hot coolant from the engine cooling system as it exits the engine, passes it through a suitable heat exchanger and returns it to the engine cooling circuit at a location upstream of an engine-driven pump used to circulate the coolant through the engine cooling circuit. In such an arrangement, the heater circuit bypasses the engine cooling radiator and a combined bypass and flow-controlling thermostat is used to control the flow though the engine cooling radiator and a bypass circuit arrange to bypass the engine cooling radiator.

Since the coolant pump in such a system is driven from the engine, the pump output performance is related to the speed at which the engine is operating and there is a considerable difference in the flowrate and pressure provided by the pump when the engine is idling compared to when it is running at a normal operating speed.

A consequence of this variation in pump output is that at low engine speeds such as when then vehicle is idling or being driven in slow moving traffic the supply of hot coolant to the heater circuit may be inadequate to heat the air delivered to the vehicle compartment and this results in cool, rather than warm air, being supplied.

The object of the present invention is to provide an improved combined bypass and thermostat assembly for a heater of a vehicle that is less effected by variations in engine speed.

SUMMARY OF THE INVENTION

According to the invention there is provided a combined bypass and thermostat valve assembly, for use in an engine cooling system, of a motor vehicle engine, and vehicle heating system, comprising a housing defining a valve chamber, a thermostat and first and second valves mounted in the chamber, its valves being operably connected to the thermostat, the housing having a first inlet to connect the valve chamber to a radiator of the cooling system, a second inlet to connect the valve chamber to a bypass circuit of the cooling system and an outlet to connect the valve chamber to a return for cooling liquid to the engine, the thermostat having a temperature responsive valve actuating means connected to the first valve to regulate the flow of fluid from the first inlet to the outlet in response to the sensed temperature of cooling liquid in contact with the temperature responsive valve actuating means and the second valve to regulate the flow of fluid from the second inlet to the outlet, operation of the first valve against the bias of a first spring being determined by the temperature of cooling liquid in the valve chamber and the second valve being biased to a closed state by a second spring so as to restrict flow through the second inlet whenever cooling liquid pressure in the second inlet is below a predetermined level, the second valve being capable of remaining closed under the bias of the second spring when the first valve is closed.

Also according to the invention there is provided a motor vehicle engine cooling system and vehicle heating system, the cooling system comprising an radiator through which a flow of engine coolant can be passed, a bypass circuit for bypassing the radiator, a combined bypass and thermostat assembly, located downstream of the radiator and bypass circuit, to regulate the flow of coolant through the bypass circuit and said radiator and a pump to circulate coolant around the cooling system, the heater system have a fluid to air heat exchanger having an inlet connected to the cooling system at a position prior to entry of the coolant to the radiator and an outlet connected to the cooling system at a position downstream of the combined bypass and thermostat assembly thereby enabling coolant to be passed through the heat exchanger when coolant flow through the bypass circuit and radiator is prevented by the combined bypass and thermostat assembly, a housing defining a valve chamber, a thermostat and first and second valves mounted in the chamber, its valves being operably connected to the thermostat, the housing having a first inlet to connect the valve chamber to a radiator of the cooling system, a second inlet to connect the valve chamber to a bypass circuit of the cooling system and an outlet to connect the valve chamber to a return for cooling liquid to the engine, the thermostat having a temperature responsive valve actuating means connected to the first valve to regulate the flow of fluid from the first inlet to the outlet in response to the sensed temperature of cooling liquid in contact with the temperature responsive valve actuating means and the second valve to regulate the flow of fluid from the second inlet to the outlet, operation of the first valve against the bias of a first spring being determined by the temperature of cooling liquid in the valve chamber and the second valve being biased to a closed state by a second spring so as to restrict flow through the second inlet whenever cooling liquid pressure in the second inlet is below a predetermined level, the second valve being capable of remaining closed under the bias of the second spring when the first valve is closed.

BRIEF DESCRIPTION OF THE DRAWINGS

The invention will now be described, by way of example, with reference to the accompanying drawings, in which.

Figure 1:
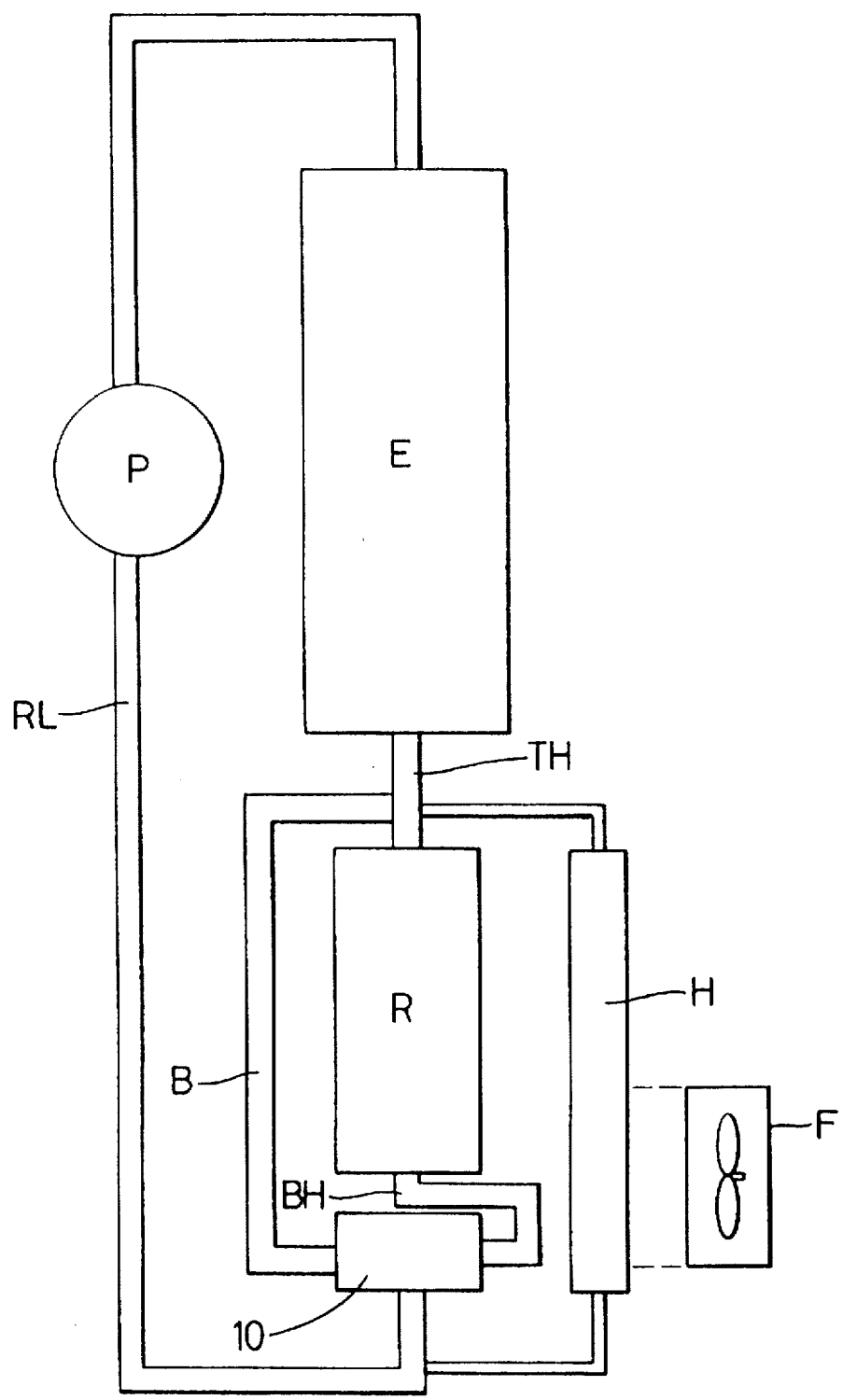
FIG. 1 is a diagrammatic representation of a cooling system for an engine of a motor vehicle and associated heater system according to the invention.

A vehicle engine cooling system, illustrated by FIG. 1, comprises an air-cooled radiator R through which a flow of hot coolant is passed through a top hose TH from an internal combustion water cooled engine E.

An engine-driven pump P is located in a return line RL to circulate the coolant through the cooling system. A combined bypass and thermostat valve assembly 10 is positioned between a bottom hose BH, leading from the radiator R, and the return line RL to control the flow of coolant through the radiator R and a radiator bypass circuit B.

A heater system, comprising a liquid to air heat exchanger H, and a fan F, is associated with the cooling system and is supplied, under the influence of the pump P, with hot liquid, from the top hose TH of the cooling circuit, which passes through the heat exchanger H and returns to the return line RL of the cooling circuit downstream of the combined bypass and thermostat assembly 10. With such an arrangement the heater circuit bypasses the radiator R and parallels the bypass circuit B and the combined bypass and thermostat assembly 10 to define a distinct but interconnected flow circuit.

The heat exchanger H is of the multiple pass type so as to maximize heat transfer the hot liquid passing therethrough to the air to be heated. Such a construction results in a flow path of substantially greater resistance than that through either the radiator R or the bypass circuit B. Consequently, whenever the thermostat combined bypass and assembly 10 is operating to allow flow through either the radiator R or the bypass circuit B the majority of coolant will pass through these circuits to the detriment of the flow through the heat exchanger H. Although this is not a problem when the engine is operating at normal running speeds, at lower running speed the flow through the heat exchanger H is so reduced that the performance of the heater system is affected adversely.

To overcome this problem, the combined bypass and thermostat assembly 10 of the present invention is designed as described below to prevent the flow of coolant through the bypass circuit B when the pressure in the bypass circuit B is below a predetermined level.

Figure 2:
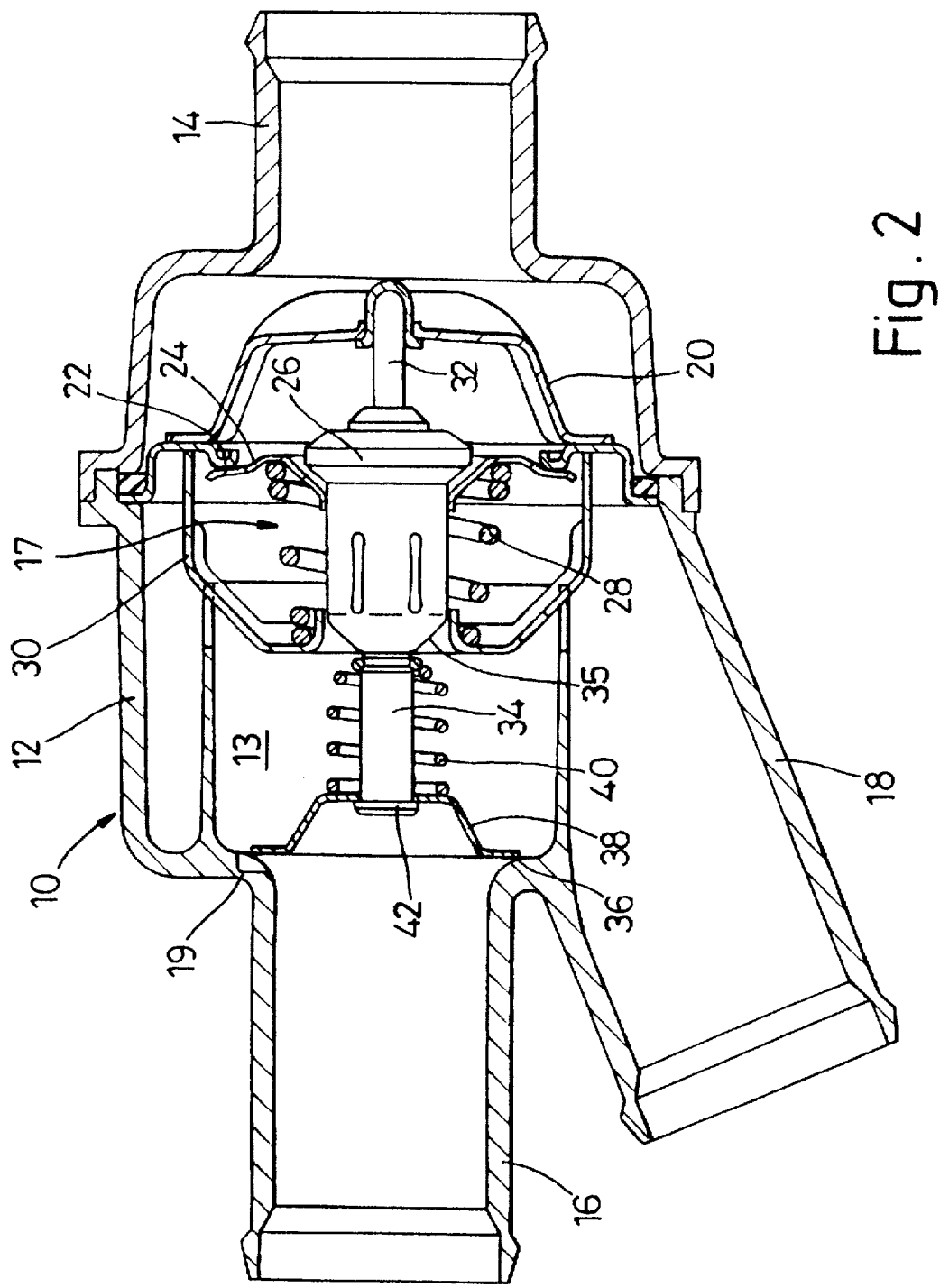
FIG. 2 is a cross-sectional view of a combined bypass and thermostat valve assembly forming part of the cooling system.

With particular reference to FIG. 2, the combined bypass and thermostat assembly 10 comprises a housing 12 defining a chamber 13, a first fluid flow inlet in the form of a return flow entry tube 14 for connection to the bottom hose BH from the radiator, a second fluid flow inlet in the form of a bypass flow entry tube 16 for connection the bypass circuit B, and a fluid outlet in the form of an outlet tube 18 for connection to the return line RL.

A thermostat 17 is mounted within the chamber 13 to control the flow of coolant entering via the return and bypass tubes 14 and 16. The thermostat 17 has a forward bridging frame 20 which is secured at its periphery to the housing 12 and forms an annular seat 22 defining a return flow entry port. A first valve member 24 is secured to a temperature-responsive valve actuating means in the form of a reaction body 26 for abutment against the seat 22 to thereby selectively close the first fluid inlet 14.

A main coil spring 28 is located about the reaction body 26 and extends between a rearward frame 30 secured to the forward frame 20 and the valve member 24. The first spring 28 acts to bias the valve member 24 into engagement with the annular seat 22.

The reaction body 26 has a drive pin 32 extending therefrom for engagement with the forward frame 20 and a stud 34 projecting rearwardly toward the bypass entry tube 16.

At an inner end of the bypass entry tube 16 the housing forms a seat 36. A bypass valve member 38 is slidably mounted on the stud 34 and biased towards the seating 36 by a secondary coil spring 40.

The length of the stud 34 is sufficient to allow the second valve member 38 to contact the seat 36 even when the first valve is in contact with the annular seat 22.

The secondary spring 40 acts between the valve member 38 and a rear end surface 35 of the reaction body 26. The valve member 38 is retained upon the stud 34 by a retaining head 42 at a free end of the stud 34.

The secondary spring 40 has a relatively low spring rate of approximately 0.5 kg per mm and is arranged to bias the valve member 38 against the seat 36 when the main valve 24 is closed to provide approximately a 1.5 kg preload.

The exact spring rate chosen for the secondary spring 40 and the preload depend upon the surface area of the valve member 38 and the characteristics of the pump "P".

The bypass valve member 38 is able to abut the bypass seat 36 even when the main valve member 24 is closed.

The assembly, as shown in FIG. 2, is in a start-up condition, with the main valve 24 closed to prevent the flow of coolant through the radiator "R". The bypass valve member 38 is held lightly against the bypass seating 36 by the secondary spring 40 to restrict bypass flow through the bypass circuit "B". However, a small amount of flow is allowed to enter the chamber through a bleed passage 19 so as to ensure that the temperature-sensitive reaction body 26 is maintained in coolant corresponding in temperature to that exiting the engine "E".

The restriction of the flow through the bypass circuit "B" enhances flow through the heat exchanger "H" of the heater circuit thereby improving the performance of the heater.

As the engine speed is increased from idle, the pressure in the bypass circuit "B" increases until when the engine reaches a predetermined speed the pressure acting on the valve member 38 from the bypass circuit "B" exceeds the preload applied by the secondary spring 40. The valve member 38 will then gradually lift off of the seat 36 thereby allowing coolant to flow through the bypass circuit "B".

Thus, as the engine speed increases the pressure in the bypass circuit "B" increases and due to the relatively low spring rate of the secondary spring 40, the valve member is moved away from the seat 36 thereby ensuring that there is no risk of the engine being starved of coolant prior to the opening of the main valve 24. This is important because a lack of coolant flow through the engine "E" can result in localized heating and possible engine damage.

By selecting an appropriate spring rate and preload for the secondary spring 40 the bypass valve member 38 can be arranged to be held in engagement with the seat 36 up to any desired engine speed, for example 1,500 R.P.M., and then be fully open at an engine speed of, for example 2,000 R.P.M.

After operation of the engine "E" for a few minutes, the temperature of the bypass flow increases thereby causing the reaction body 26 to move the main valve member 24 rearwards away from the annular seat 22 and allow coolant to flow through the radiator "R". This will result in a corresponding movement of the rear surface 35 of the reaction body 26 towards the seat 36.

This movement acts to move the valve member 38 towards the seat 36 thereby reducing or stopping the flow through the bypass circuit "B".

When the valve member 24 of the thermostat is in a fully open condition, the secondary spring 40 is compressed such that the bypass valve member 38 is held sufficiently firmly against the associated seat 36 that the pressure in the bypass circuit "B" cannot move the valve member 38 away from the seat 36.

Between the closed and fully open positions, the assembly 10, by means of the first valve 24 and the bypass valve 38, distributes the flow of coolant between the bypass circuit "B" and the radiator "R" depending upon the temperature of the coolant in the chamber.

The bypass valve 38 and the secondary coil spring 40 function as a control means maintaining so far as possible a high flow of coolant through the heater circuit to ensure that a sufficient supply of hot coolant is passed into the heat exchanger to warm the air for the passenger compartment.

I claim:

1. A combined bypass and thermostat valve assembly, for use in an engine cooling system, of a motor vehicle engine, and vehicle heating system, comprising a housing defining a valve chamber, a thermostat and first and second valves mounted in the chamber, the valves being operably connected to the thermostat, the housing having a first inlet to connect the valve chamber to a radiator of the cooling system, a second inlet to connect the valve chamber to a bypass circuit of the cooling system and an outlet to connect the valve chamber to a return for cooling liquid to the engine, the thermostat having a temperature responsive valve actuating means connected to the first valve to regulate the flow of fluid from the first inlet to the outlet in response to the sensed temperature of cooling liquid in contact with the temperature responsive valve actuating means and to the second valve to regulate the flow of fluid from the second inlet to the outlet, operation of the first valve against the bias of a first spring being determined by the temperature of cooling liquid in the valve chamber, the second valve being biased to a closed state by a second spring so as to restrict flow through the second inlet whenever cooling liquid pressure in the second inlet is below a predetermined level, and wherein the second valve is capable of remaining closed under the bias of the second spring while the first valve is closed.

2. A combined thermostat and bypass valve assembly according to claim 1 in which when the first valve is closed the second valve is biased to the closed state by a small predetermined preload provided by the bias of the second spring.

3. A combined thermostat and bypass valve assembly according to claim 1 in which the spring rate of the second spring is relatively low so that after initial opening of the second valve a small increase in the pressure in the second inlet will fully open the second valve.

4. A combined thermostat and bypass valve assembly according to claim 1 in which the second spring is interposed between a valve member of the second valve and the temperature responsive valve actuating means so that when the second valve is closed any opening of the first valve increases the spring-loading on the second valve member by the second spring.

5. A combined thermostat and bypass valve assembly according to claim 4 in which when the first valve is fully open the loading applied to the second valve member by the second spring is sufficient to prevent the second valve from being opened by cooling liquid pressure in the second inlet.

6. A combined thermostat and bypass valve according to claim 1 in which a bleed passage allows coolant to bypass the second valve, when closed, in an amount sufficient only to expose the temperature responsive actuating means to coolant substantially at a temperature at which the coolant leaves the engine.

7. A motor vehicle engine cooling system and vehicle heating system, the cooling system, of a motor vehicle engine, comprising a radiator through which a flow of engine coolant can be passed, a bypass circuit for bypassing the radiator, a combined bypass and thermostat assembly, located downstream, relative to flow of coolant through the cooling system, of the radiator and bypass circuit, to regulate the flow of coolant through the bypass circuit and said radiator, and a pump to circulate coolant around the cooling system, the heater system have a fluid to air heat exchanger having an inlet connected to the cooling system at a position upstream of the radiator and an outlet connected to the cooling system downstream of the combined bypass and thermostat assembly thereby enabling coolant to be passed through the heat exchanger when coolant flow through the bypass circuit and radiator is prevented by the combined bypass and thermostat assembly, the combined bypass and thermostat assembly comprising a housing defining a valve chamber, a thermostat and first and second valves mounted in the chamber, the valves being operably connected to the thermostat, the housing having a first inlet connecting the valve chamber to the radiator, a second inlet connecting the valve chamber to a bypass circuit of the cooling system and an outlet to connect the valve chamber to a return for cooling liquid to the engine, the thermostat having a temperature responsive valve actuating means connected to the first valve to regulate the flow of fluid from the first inlet to the outlet in response to the sensed temperature of cooling liquid in contact with the temperature responsive valve actuating means and to the second valve to regulate the flow of fluid from the second inlet to the outlet, operation of the first valve against the bias of a first spring being determined by the temperature of cooling liquid in the valve chamber, the second valve being biased to a closed state by a second spring so as to restrict flow through the second inlet whenever cooling liquid pressure in the second inlet is below a predetermined level, and wherein the second valve is capable of remaining closed under the bias of the second spring while the first valve is closed.

8. A motor vehicle engine cooling system and vehicle heating system according to claim 7 in which when the first valve is closed the second valve is biased to the closed state by a small predetermined preload provided by the bias of the second spring.

9. A motor vehicle engine cooling system vehicle heating system according to claim 7 in which the spring rate of the second spring is relatively low so that after initial opening of the second valve a small increase in the pressure in the second inlet will fully open the second valve.

10. A motor vehicle engine cooling system and vehicle heating system according to claim 7 in which when the first valve is open and the second valve is closed, the load applied by the second spring to the bias second valve is increased by the movement of the temperature responsive valve actuating means towards the second inlet so that when the first valve is fully open the pressure in the bypass circuit is insufficient to open the second valve.

* * * * *

Disclaimer

5,787,845—William Richard Hutchins, Kenilworth, England. COMBINED BYPASS AND THERMOSTAT ASSEMBLY. Patent dated August 4, 1998. Disclaimer filed October 22, 1999, by assignee, Rover Group Limited.

Hereby enters this disclaimer to claims 1-3 and 7-9 of said patent.
*(Official Gazette, May 7, 2002)*